May 23, 1961  B. D. PRIESTMAN ET AL  2,985,477
CONTROL ASSEMBLY FOR A VEHICLE DOOR LATCH
Filed May 19, 1960  4 Sheets-Sheet 1

INVENTORS
Bewley D. Priestman &
BY Bela Sandor

W.S. Pettigrew
ATTORNEY

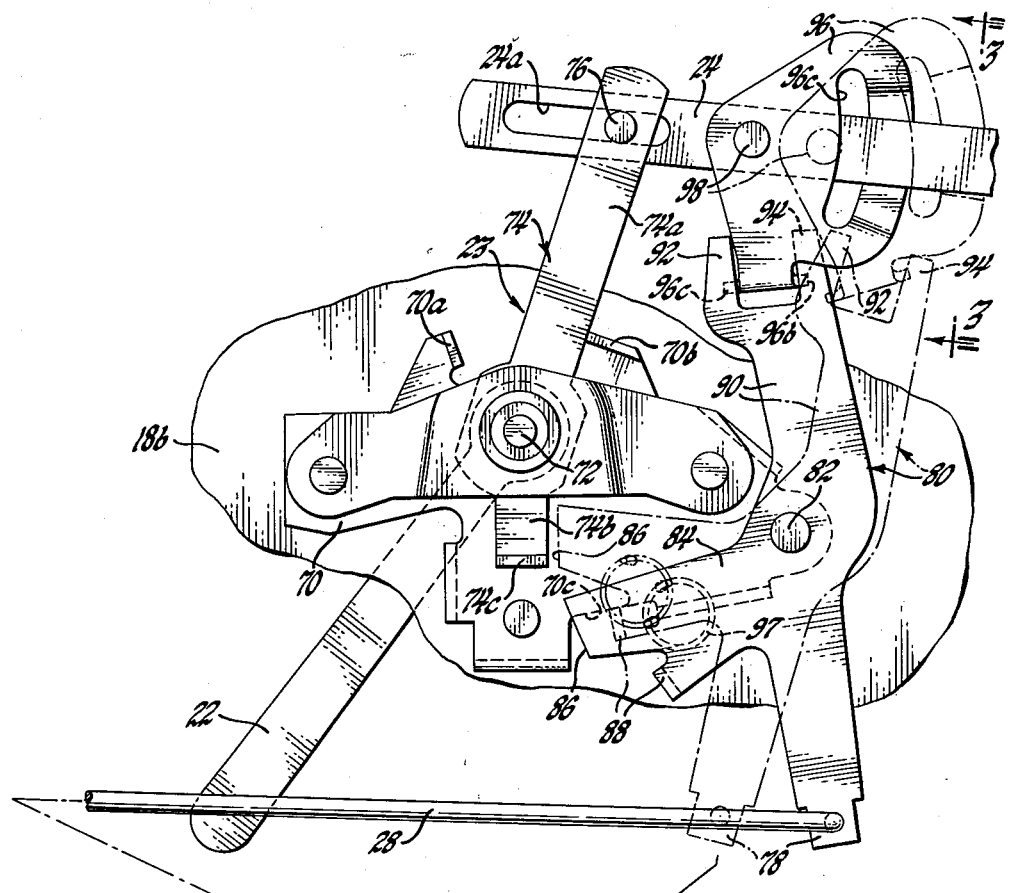
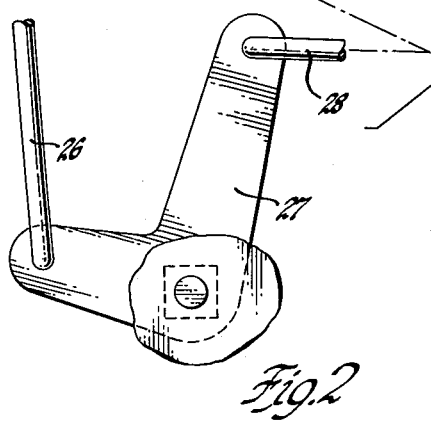
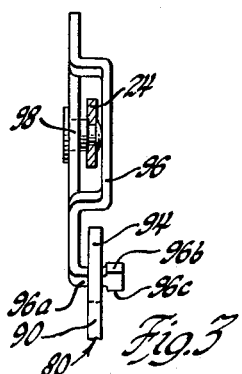
Fig. 2
Fig. 3
INVENTORS
Bewley D. Priestman &
BY Bela Sandor
W. S. Pettigrew
ATTORNEY May 23, 1961     B. D. PRIESTMAN ET AL     2,985,477
CONTROL ASSEMBLY FOR A VEHICLE DOOR LATCH
Filed May 19, 1960     4 Sheets-Sheet 3
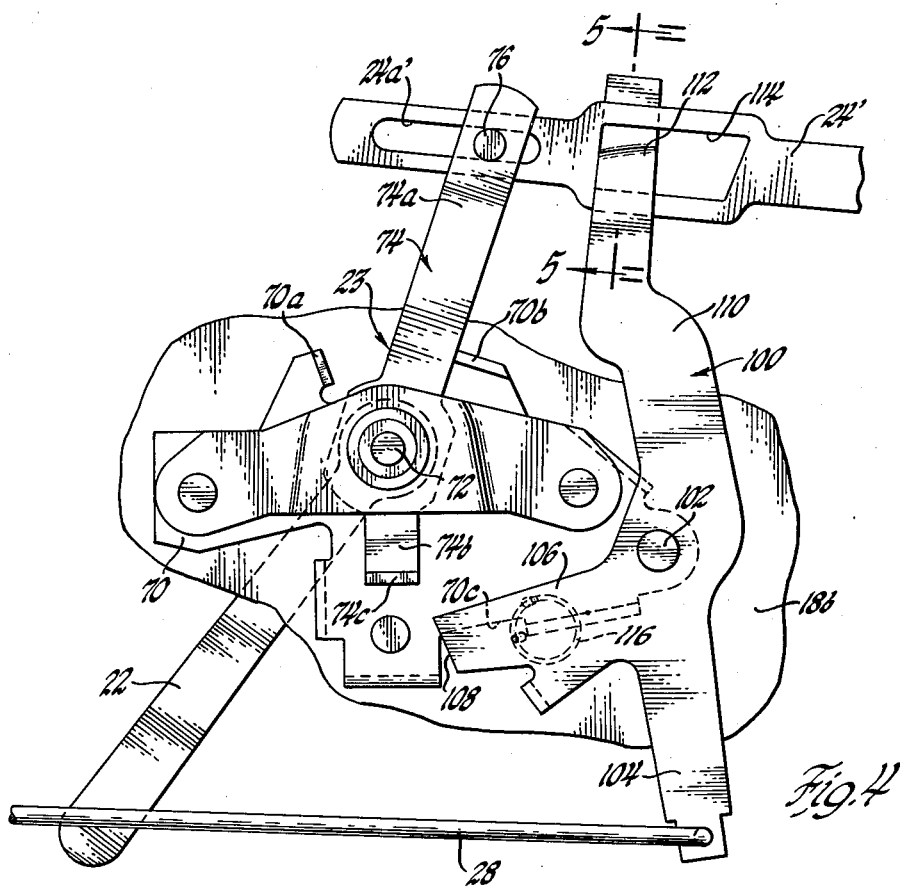
INVENTORS
Bewley D. Priestman &
BY   Bela Sandor
W. S. Pettigrew
ATTORNEY May 23, 1961  B. D. PRIESTMAN ET AL  2,985,477
CONTROL ASSEMBLY FOR A VEHICLE DOOR LATCH
Filed May 19, 1960  4 Sheets-Sheet 4
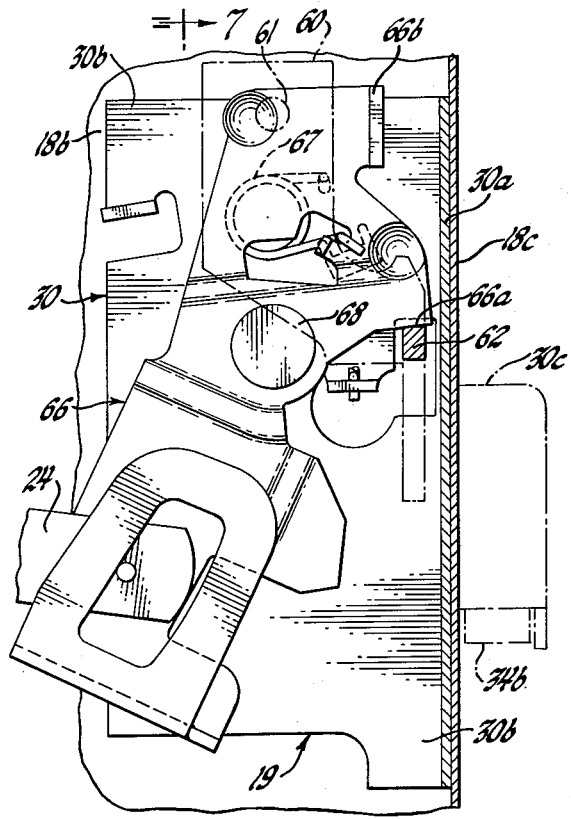
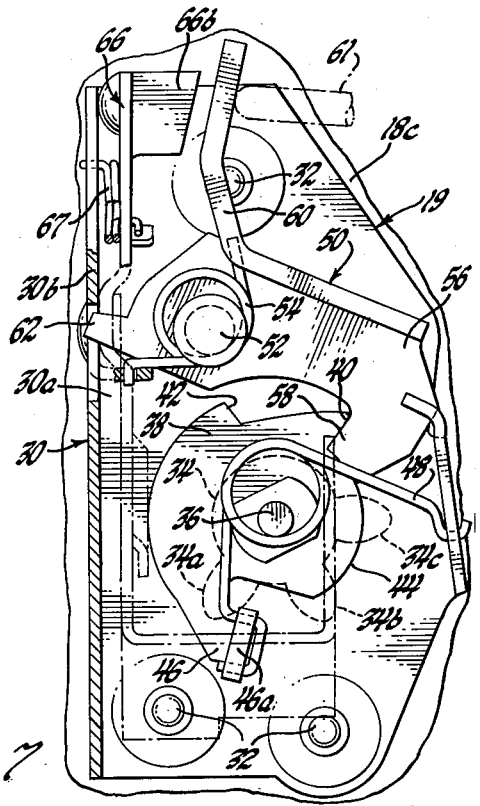
INVENTORS
Bewley D. Priestman &
BY Bela Sandor
W. S. Pettigrew
ATTORNEY

United States Patent Office 2,985,477
Patented May 23, 1961

---

2,985,477

CONTROL ASSEMBLY FOR A VEHICLE DOOR LATCH

Bewley D. Priestman, Grosse Pointe, and Bela Sandor, Detroit, Mich., assignors to General Motors Corporation, Detroit, Mich., a corporation of Delaware Filed May 19, 1960, Ser. No. 30,141

8 Claims. (Cl. 292—336.3)

---

This invention relates to a control assembly for a vehicle door latch, and more particularly to a control assembly which blocks the door handle against movement when the door is locked.

One feature of the invention is that it provides an improved control assembly for a vehicle door latch. Another feature of the invention is that it provides a control assembly in which the door handle is blocked against movement when the door is locked. A further feature of the invention is that it provides a control assembly particularly adapted for use with a vehicle door latch having an operating member which is shiftable in one direction to unlatch the door and shiftable in another direction to lock the door. Still another feature of the invention is that it provides means for adapting a known type of door latch for use with a different type of locking apparatus.

Other features and advantages of the invention will be apparent from the following description and drawings, in which:

Figure 2 is an enlarged view of the control assembly shown in Figure 1, the control assembly parts being shown in solid lines in door-unlocked position and in broken lines in door-locked position;

Figure 3 is a detail section taken on the line 3—3 of Figure 2;

Figure 4 is a view similar to Figure 2 but showing a modified form of apparatus;

Figure 5 is a detail section taken along the line 5—5 of Figure 4;

Figure 6 is an enlarged longitudinal vertical section through the rear door of Figure 1, showing the door latch in section with the parts in unlocked position; and Figure 7 is a section taken at right angles to Figure 6 along the line 7—7 thereof.

Figure 1:
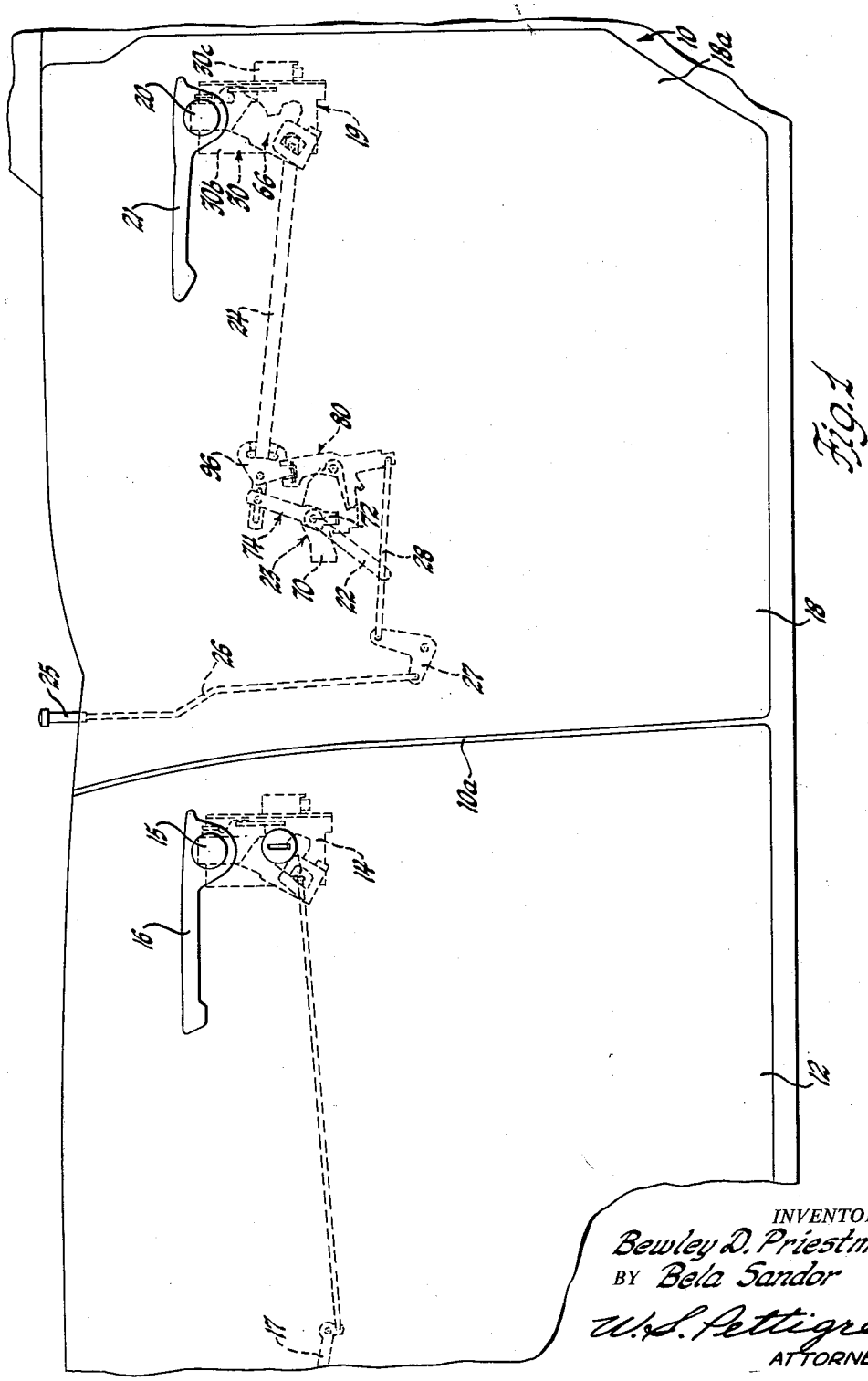
Figure 1 is a fragmentary side elevational view of an automobile having the improved control assembly mounted in the rear door thereof.

In the copending application of Robert C. Liem and Edmund F. Sarosy, entitled "Latching Means for an Automobile Door," filed September 28, 1959, as Serial No. 842,721, there is disclosed an automobile door latch of the type wherein a rotatable bolt is held against rotation in one direction by a detent. In this latch there is an operating member which is shiftable in one direction to move the detent away from the bolt and unlatch the door and shiftable in another direction to swing a blocking portion of the operating member into the path of movement of the detent so that the door is locked against outside operation. The use of a single operating member which is shiftable in one direction to unlatch the door and shiftable in another direction to lock the door reduces the number of parts in the latch. In application S.N. 842,721 the operating member may be shifted to unlatch the door by turning an inside remote handle, which is mounted on the door inner panel, in one direction and the operating member may be shifted to lock the door by turning the handle in the opposite direction.

This invention constitutes an improvement over the apparatus of application S.N. 842,721 in that it provides an adaptation whereby the operating member in the latch may be shifted to locked position by means of a conventional garnish molding button rather than by means of turning the inside remote handle. In many applications it is deemed preferable to utilize a door locking means which is separate from the door unlatching means, this being particularly important as a safety feature in that it obviates the possibility that the door might inadvertently be unlatched by turning the handle in the wrong direction when an attempt is made to lock the door while the automobile is in motion. According to the invention, the door latch of application S.N. 842,721 alternatively may be used with a conventional garnish molding push button type of locking device.

Referring now more particularly to the drawings, the reference numeral 10 designates generally an automobile body having a front door 12 which is hingedly mounted in conventional manner (not shown) at its front edge on the body 10 and which, adjacent its rear edge, carries a latch 14 which may be operated from outside the automobile by a push button 15 slidably mounted in a fixed gripping handle 16. The latch may be operated from inside the automobile by a conventional turn handle 17 mounted on the door inner panel.

The automobile 10 has a rear door 18 which is hingedly mounted in conventional manner (not shown) on a body center pillar 10a. The door 18 includes a door outer panel 18a (Fig. 1), a door inner panel 18b (Figs. 2, 4 and 6) and a jamb face 18c (Figs. 6 and 7). Near its rear edge the door 18 mounts a latch designated generally as 19. The latch may be operated from outside the automobile by a push button 20 which is slidably mounted in a gripping handle 21 that is bolted to the door outer panel. In order to operate the latch from the inside, there is a turn handle 22 remotely located from the latch and connected thereto through a control assembly designated generally as 23 and a rod 24. The door may be locked against outside operation from inside the passenger compartment upon depression of a conventional type of garnish molding push button 25 which is connected by a rod 26 to one arm of a bell crank 27 pivotally mounted inside the door. The other arm of the bell crank 27 is connected by another rod 28 to the control assembly 23.

The detailed construction of the door latch 19 does not form part of this invention and the door latch per se is described and claimed in application S.N. 842,721. However, in order to facilitate an understanding of this invention, particularly inasmuch as the invention is used with a door latch in which there is an operating member which is shiftable in one direction to unlatch the door and shiftable in another direction to lock the door, a brief description of the construction and operation of the latch 19 follows.

The latch has a frame designated generally as 30 including a body portion 30a which lies against the inner surface of the jamb face 18c of the door and which is secured thereto by a plurality of bolts 32. A flange portion 30b extends at right angles from the body 30a of the frame and lies parallel to the inner panel 18b of the door 18. A latch bolt 34 is pivotally mounted on the body 30a of the latch frame on a stub shaft 36 which is journaled in the frame and in the outer wall of a bolt housing portion 30c of the frame. As best seen in Figure 7, the bolt is formed with three radial peripheral teeth 34a, 34b and 34c which, when the door is closed, engage complementary teeth on a striker (not shown) that is mounted on the automobile body 10. The way in which a so-called gear type bolt of this character cooperates with the striker is well understood in the art and is illustrated and described in the patents to Cockburn et al. 2,871,049 and Van Voorhees 2,835,526.

On the other side of the frame body portion 30a there is a latch plate 38 which is fixedly secured to the stub shaft 36 so that the bolt 34, the shaft 36 and the latch plate 38 comprise a unitary latching means. The latch plate is formed with a first latching notch 40 and a second latching notch 42, these notches cooperating with a detent which is later to be described to define fully latched and safety latched positions of the latching means. Extending around the periphery of the latch plate 38 from the first latching notch 40 there is a cam surface 44 which is arcuate about the center of the shaft 36 and which is the same distance from the shaft as is the bottom of the first latching notch 40. This cam surface slidably supports the detent in the event of overtravel of the bolt in latching direction. A stop arm 46 projects outwardly from the latching plate 38 to limit pivotal movement of the latching means in an unlatching direction, and a turned foot 46a on the free end of the arm 46 provides a means for blocking the locking device, later to be described, from being moved to locking position in the event the latching means is in safety latched position. A spring 48 is mounted on the shaft 36 and has one end hooked into the latch frame and the other end hooked on the latching plate 38 to provide a bias for the latching means in a counterclockwise or unlatching direction.

In order to hold the latching means in fully latched or safety latched position there is a combined detent and release member 50 which is pivotally mounted on a stud 52 projecting from the latch frame. A spring 54, which is coiled about the stud 52, has one end connected to the latch frame and the other end contacting the member 50 to urge the member 50 into holding engagement with one of the notches 40 or 42 in the latch plate 38. The detent-release-member 50 has a detent arm 56 which terminates in a projecting detent foot 58 adapted to engage one of the notches 40 or 42 in the latching plate 38 to hold the latching means against rotary movement in an unlatching direction. A second arm 60 of the detent-release member 50 extends upwardly from the stud 52 for engagement with a push rod 61 which extends inwardly from the outside operating push button 20. A third arm 62 of the combined detent-release member 50 extends into a slot in the flange portion 30b of the frame for engagement by an operating member 66 to unlatch the door from inside the automobile. In the event the detent is swung either by outside operating means or inside operating means so that its foot 58 is moved out of holding engagement with the latching plate 38, the bolt may rotate freely and the door 18 may be pulled open. Rotation of the bolt and latching plate in an unlatching direction is limited by abutment of the stop arm 46 with the detent member 50.

Referring more particularly to Figure 6, the operating member 66 constitutes a combined remote unlatching and inside locking lever which is pivotally mounted on the frame flange 30b by means of a stud 68 projecting therefrom. The operating member is connected at its lower end to the remote rod 24, which in turn is connected through the control assembly 23 to the inside turn handle 22 so that turning the handle 22 in a counterclockwise direction as the parts appear in Figure 1 pulls the rod 24 to the left and swings the operating member 66 so that a shoulder 66a on the operating member picks up the detent release arm 62 and swings it downwardly to swing the detent out of holding engagement with the latching means so that the door may be opened. Conversely, moving the rod 24 axially to the right in Figure 1 swings the operating member in the opposite direction from the unlocked position shown in Figure 6 to a locked position wherein movement of the detent 50 is blocked. Near the top of the operating member 66 there is a right angular blocking flange 66b which, when the parts are in the unlatched position, lies to one side of the path of unlatching movement of the detent-release lever 50 but, when the parts are in locked position, lies directly in the path of unlatching movement of the member 50 and blocks movement thereof.

An overcenter spring 67 is connected between the operating member 66 and the latch frame. This spring passes overcenter during movement of the operating member 66 from its unlocked position to its locked position so that the spring 67 yieldably biases and holds the operating member 66 either in locked or unlocked position.

From the above description of the latch 19 it will be understood that the operating member 66 of the latch is shiftable in one direction to unlatch the door and is shiftable in another direction to lock the door. The control assembly which is designated generally as 23 provides a novel means to achieve this operation and permits locking to be accomplished through a conventional molding push button device.

Referring more particularly to Figure 2, the control assembly includes a frame member 70 which is bolted to the door and which has a spindle 72 rotatably journaled thereon. The spindle projects through the door inner panel 18b and on its inner end fixedly mounts the turn handle 22. Inside the door at the other end of the spindle 72 a lever designated generally as 74 is fixedly mounted, the lever having an upwardly extending operating portion 74a and a downwardly extending stop portion 74b which terminates in a right angular stop tab 74c. A pin 76 projects from the upper end of the operating portion 74a of the lever 74 through an elongated axially extending slot 24a in the rod 24 to provide a lost motion connection between the lever and the rod. In order to unlatch the door from inside the automobile the handle 22 and lever 74 are swung in a counterclockwise direction (Figure 2). The first increment of this movement does not affect the operating member 66 of the door latch since the pin 76 merely moves in the slot 24a. However, when the pin reaches the left-hand end of the slot 24a, additional rotation of the handle 22 and the lever 74 in a counterclockwise direction will move the rod 24 axially to the left and swing the operating member 66 to move the detent 50 to its unlatched position out of holding engagement with the latching plate 38 in the manner earlier described. Stop tabs 70a and 70b on the frame 70 limit swinging movement of the handle 22 and the lever 74.

As described earlier, the garnish molding button 25 is connected to the control assembly 23 through a rod 26, a bell crank 27 and a second rod 28, the end of which is connected to an arm 78 of a two-part locking lever, the lower portion of which is designated generally as 80. The lower portion of the locking lever 80 is pivoted intermediate its ends at 82 on the frame 70 and, in addition to the downwardly extending arm 78, is formed with a laterally extending arm 84 having a blocking end surface 86 and a projecting limiting stop tab 88. Another arm 90 extends upwardly from the pivot 82 and terminates in a fork between the prongs 92 and 94 of which a second part 96 of the locking lever is mounted. An overcenter spring 97 yieldably holds the locking lever in locked or unlocked position. As shown in Figure 3, the second part of the locking lever has a bent portion 96a at its lower end which projects through the space between the prongs 92 and 94 and which at its free end has oppositely disposed flanges 96b and 96c to prevent disengagement of the two lever parts. This arrangement provides a swivel connection between the two lever parts to accommodate normal mass production tolerances. The second part 96 of the locking lever is pivotally connected by a pin 98 to the rod 24 and a guide slot 96c is formed in the second lever part 96. The rod 24 projects through this guide slot to prevent misalignment of the parts.

In the operation of the control assembly, when the handle 22 is turned in a counterclockwise direction from the position of Figures 1 and 2, the lever 74, which is rigidly connected to the handle 22 through the spindle 72, also swings in a counterclockwise direction. The first increment of handle movement is utilized to take up the lost motion provided by the pin and slot connection 76, 24a. When the pin 76 reaches the end of the slot 24a, further turning movement of the handle pulls the rod 24 to the left in Figures 1 and 2 and unlatches the door in the manner earlier described. It is desirable to provide for so-called remote undogging to permit the door to be opened from the inside whether or not it is locked against outside operation and, in the apparatus of Figure 2, this function is achieved by the connection 98 between the locking lever and the rod 24. When the rod 24 moves to the left it will carry the locking lever with it from the locked position shown in broken lines in Figure 2 to the unlocked position shown in solid lines.

In order to lock the door the garnish molding button or locking member 25 is depressed. This swings the bell crank 27 in a counterclockwise direction, pulling on the rod 28 and swinging the locking lever clockwise from its solid line position in Figure 2 to its broken line position in said figure. When in the broken line or locked position, the blocking surface 86 lies adjacent to and in the path of movement of the stop tab 74c on the lever 74 so that the handle 22 is blocked against unlatching movement. The stop 88 on the locking lever also has been swung up into abutting relation with a stop surface 70c on the frame 70 to assure proper spacial relationship between the blocking portions 74c and 86. It should be noted that the lost motion connection between the lever 74 and the rod 22 permits locking and unlocking movements of the rod 24 without imparting any movement to the door handle 22.

Figures 4 and 5 show a modified arrangement in which a different means is utilized for providing tolerance for normal production variations. In this modified form of the invention, the unlatching parts are identical with the unlatching parts of Figures 1 and 2 and are identified by the same reference characters. The locking lever and its connection to the rod that extends to the latch have been modified.

In this form of the invention the locking lever 100 is formed in one part. The lever is pivoted at 102 on the frame and has a downwardly extending arm 104 which is connected to the rod 28 which extends from the garnish molding button structure. A laterally extending arm 106 has a blocking surface 108 for cooperation with the blocking tab 74c on the lever 74. An upwardly extending arm 110 has an offset or dog-leg portion 112 which, as shown best in Figure 5, projects through an elongated slot 114 formed in the rod 24', and an overcenter spring 116 yieldably holds the blocking lever in locked or unlocked position. In all other respects the rod 24' is similar to the rod 24 of Figures 1 and 2.

In the modified apparatus of Figures 4 and 5, shifting the rod 24' to the left when the door handle 22 is turned does not swing the locking lever 110. If the parts are in the unlocked position shown in Figure 4, the dog-leg and slot connection between the locking lever 110 and the rod 24' provides for production variations in the size and location of the parts.

While we have shown and described two embodiments of our invention, it is capable of many modifications. Changes, therefore, in the construction and arrangement may be made without departing from the spirit and scope of the invention, as set forth in the appended claims.

We claim:

1. A control assembly for a vehicle door latch having an operating member which is shiftable in one direction to unlatch the door and shiftable in another direction to lock the door, comprising: a frame member mounted on the door; a spindle rotatably journaled on said frame member; a turn handle fixedly mounted on one end of said spindle; a lever fixedly mounted on the other end of said spindle; a rod connected to the operating member in the door latch; means connecting said lever to said rod, whereby said rod is moved to shift said operating member to unlatch the door when the turn handle is actuated; a movable locking member carried on the door; and a locking lever pivotally mounted on said frame, said locking lever being connected to said rod and to said locking member, movement of said locking member to a door locked position causing said locking lever to swing and move said rod to shift said operating member to lock the door, said locking lever having a blocking portion which, when in locked position, blocks movement of said lever to block said handle against turning.

2. Apparatus of the character claimed in claim 1, wherein said locking lever is formed in two parts which are swively connected together, one of said parts being connected to said rod and the other of said parts being connected to said locking member.

3. Apparatus of the character claimed in claim 1, wherein there is a lost motion connection between said locking lever and said rod.

4. A control assembly for a vehicle door latch having an operating member which is shiftable in one direction to unlatch the door and shiftable in another direction to lock the door, comprising: a frame member mounted on the door; a spindle rotatably journaled on said frame member; a turn handle fixedly mounted on one end of said spindle; a lever fixedly mounted on the other end of said spindle; a rod connected to the operating member in the door latch; means providing a lost motion connection between said lever and said rod, whereby said rod is moved axially to shift said operating member to unlatch the door when the turn handle is actuated; a movable locking member carried on the door; and a locking lever pivotally mounted on said frame, said locking lever being connected to said rod and to said locking member, movement of said locking member to a door-locked position causing said locking lever to swing and move said rod axially to shift said operating member to lock the door, said locking lever having a blocking portion which, when in locked position, blocks movement of said lever to block said handle against turning.

5. A control assembly for a vehicle door latch having an operating member which is shiftable in one direction to unlatch the door and shiftable in another direction to lock the door, comprising: a frame member mounted on the door; a spindle rotatably journaled on said frame member; a turn handle fixedly mounted on one end of said spindle; a lever fixedly mounted on the other end of said spindle, said lever having an operating portion and a stop portion; a rod connected to the operating member in the door latch; means connecting the operating portion of said lever to said rod, whereby said rod is moved axially to shift said operating member to unlatch the door when the turn handle is actuated; a movable locking member carried on the door; and a locking lever pivotally mounted on said frame, said locking lever being connected to said rod and to said locking member, movement of said locking member to a door locked position causing said locking lever to swing and move said rod axially to shift said operating member to lock the door, said locking lever having a blocking portion which, when in locked position, lies in the path of movement of the stop portion of said lever to block said handle against turning.

6. A control assembly for a vehicle door latch having an operating member which is shiftable in one direction to unlatch the door and shiftable in another direction to lock the door, comprising: a frame member mounted on the door; a spindle rotatably journaled on said frame member; a turn handle fixedly mounted on one end of said spindle; a lever fixedly mounted on the other end of said spindle, said lever having an operating portion and a stop portion; a rod connected to the operating member in the door latch; means providing a lost motion connection between said lever and said rod, whereby said rod is moved axially in one direction to shift said operating member to unlatch the door when the turn handle is actuated but the turn handle is not actuated when the rod is moved axially in the other direction; a movable locking member carried on the door; and a locking lever pivotally mounted intermediate its ends on said frame, said locking lever being connected to said rod and to said locking member, movement of said locking member to a door locked position causing said locking lever to swing and move said rod axially to shift said operating member to lock the door, said locking lever having a blocking portion which, when in locked position, lies in the path of movement of the stop portion of said lever to block said handle against turning.

7. Apparatus of the character claimed in claim 6, wherein said locking lever is formed in two parts which are swivelly connected together, one of said parts being connected to said rod and the other of said parts being pivotally mounted on said frame and connected to said locking member.

8. Apparatus of the character claimed in claim 6, wherein there is a lost motion connection between said locking lever and said rod permitting unlatching movement of the rod without movement of the locking lever.

References Cited in the file of this patent

UNITED STATES PATENTS 2,716,569     Roethel  ---------------- Aug. 30, 1955